United States Patent
Muller et al.

(10) Patent No.: US 11,169,841 B2
(45) Date of Patent: Nov. 9, 2021

(54) TUNABLE POWER SAVE LOOP FOR PROCESSOR CHIPS

(71) Applicant: International Business Machines Corporation, Armonk, NY (US)

(72) Inventors: K Paul Muller, Wappengers Falls, NY (US); William V. Huott, Holmes, NY (US); Eberhard Engler, Tuebingen (DE); Christopher Raymond Conklin, Stone Ridge, NY (US); Stephanie Lehrer, Poughkeepsie, NY (US); Andrew A. Turner, Underhill, VT (US)

(73) Assignee: Internationl Business Machines Corporation, Armonk, NY (US)

( * ) Notice: Subject to any disclaimer, the term of this patent is extended or adjusted under 35 U.S.C. 154(b) by 0 days.

(21) Appl. No.: 16/820,808

(22) Filed: Mar. 17, 2020

(65) Prior Publication Data
US 2021/0294640 A1   Sep. 23, 2021

(51) Int. Cl.
*G06F 9/48* (2006.01)
*G06F 11/34* (2006.01)

(52) U.S. Cl.
CPC ........ *G06F 9/4812* (2013.01); *G06F 11/3495* (2013.01)

(58) Field of Classification Search
CPC .................................. G06F 11/34; G06F 9/48
USPC ......................................................... 710/269
See application file for complete search history.

(56) References Cited

U.S. PATENT DOCUMENTS

| | | | |
|---|---|---|---|
| 6,816,977 B2 | 11/2004 | Brakmo | |
| 7,251,746 B2* | 7/2007 | Fox | G06F 11/2023 714/11 |
| 7,870,407 B2 | 1/2011 | Branover | |
| 8,497,667 B2 | 7/2013 | Van Tran | |
| 9,678,564 B2 | 6/2017 | Fatemi | |
| 10,097,091 B1* | 10/2018 | Huang | G05F 1/575 |
| 2004/0123170 A1* | 6/2004 | Tschanz | G06F 1/3296 713/320 |
| 2008/0104425 A1* | 5/2008 | Gunther | G06F 1/3234 713/300 |
| 2008/0210530 A1* | 9/2008 | Itonaga | H01H 19/58 200/61.88 |

(Continued)

OTHER PUBLICATIONS

Sylvester, Dennis, et al., "Elastic: An Adaptive Self-Healing Architecture for Unpredictable Silicon," Process Variation and Stochastic Design and Text, IEEE Design & Test of Computers, IEEE, 2006, pp. 484-490.

*Primary Examiner* — Christopher B Shin
(74) *Attorney, Agent, or Firm* — Marcus Walker

(57) ABSTRACT

Aspects of the present invention disclose a method for avoiding overvoltages of a processor chip. The method includes one or more processors identifying one or more processing units of a computing device. The method further includes determining respective activity levels of one or more processing elements of the one or more processing units of the computing device. The method further includes determining respective voltages of the one or more processing units of the computing device. The method further includes regulating the respective voltages of the one or more processing units of the computing device based at least in part on the respective activity levels of the one or more processing elements.

17 Claims, 12 Drawing Sheets

(56) References Cited

U.S. PATENT DOCUMENTS

| | | | |
|---|---|---|---|
| 2014/0068284 A1* | 3/2014 | Bhandaru | G06F 1/3225 |
| | | | 713/300 |
| 2014/0068289 A1* | 3/2014 | Beck | G06F 9/4812 |
| | | | 713/320 |
| 2014/0164827 A1* | 6/2014 | Swanson | G06F 11/2035 |
| | | | 714/10 |
| 2015/0143141 A1* | 5/2015 | Echeverri Escobar | |
| | | | G06F 1/3243 |
| | | | 713/320 |
| 2015/0177798 A1* | 6/2015 | Venishetti | G06F 1/3287 |
| | | | 713/300 |
| 2015/0177811 A1* | 6/2015 | Bose | G06F 1/3243 |
| | | | 713/324 |
| 2015/0212828 A1* | 7/2015 | Zimmer | G06F 8/654 |
| | | | 713/1 |
| 2018/0011526 A1 | 1/2018 | Jang | |
| 2018/0210530 A1* | 7/2018 | Kwon | G06T 1/20 |
| 2018/0284867 A1* | 10/2018 | YangGong | G06F 1/3296 |
| 2019/0286513 A1* | 9/2019 | Roberts | G06F 11/0793 |
| 2020/0042076 A1* | 2/2020 | Idgunji | G06F 1/3296 |
| 2020/0050920 A1* | 2/2020 | Idgunji | G06F 1/329 |

\* cited by examiner

TUNABLE POWER SAVE LOOP FOR PROCESSOR CHIPS

BACKGROUND OF THE INVENTION

The present invention relates generally to the field of computing systems, and more particularly to power management of processor chips.

In recent years computing systems have become a critical part of our information infrastructure and with that a need for power management of components of these computing systems. To conserve power and manage heat, many computing systems have a power management feature that software can use to adjust the clock speed and core voltage dynamically. The central processing unit (CPU) core voltage is the power supply voltage supplied to the CPU, graphical processing unit (GPU), or other device containing a processing core. The amount of power a CPU uses is the product of this voltage and the current it draws. In modern CPUs, which are complementary metal-oxide-semiconductor (CMOS) circuits, the current is almost proportional to the clock speed, where the CPU draws almost no current between clock cycles.

Power management is a feature of some electrical appliances (e.g., computers, CPUs, GPUs, etc.) and computer peripherals (e.g., monitors, printers, etc.) that turns off the power or switches the system to a low-power state when inactive. The power management for microprocessors can be done over the whole processor, or in specific components, such as cache memory or main memory. Additionally, processors can selectively power off internal circuitry power gating.

SUMMARY

Aspects of the present invention disclose a method, computer program product, and system for avoiding overvoltages of a processor chip. The method includes one or more processors identifying one or more processing units of a computing device. The method further includes one or more processors determining respective activity levels of one or more processing elements of the one or more processing units of the computing device. The method further includes one or more processors determining respective voltages of the one or more processing units of the computing device. The method further includes one or more processors regulating the respective voltages of the one or more processing units of the computing device based at least in part on the respective activity levels of the one or more processing elements.

DETAILED DESCRIPTION

Embodiments of the present invention allow for avoiding overvoltages of a processor chip. Embodiments of the present invention modify an interrupt frequency of one or more cores of a processor unit. Embodiments of the present invention generate firmware to characterize one or more cores of a processor unit. Additionally, embodiments of the present invention generate firmware to equally distribute one or more uncharacterized cores of a processor unit to one or more processor units.

Some embodiments of the present invention recognize that processor chips are exposed to voltages that exceed a maximum voltage rating of the processor chips. Additionally, various operations cause conditions that include low current levels, which as a result can cause the voltage of the processor chips to exceed the voltage maximum rating. Although the processor chips may operate above the voltage maximum rating, the corresponding exposure can cause reliability issues (e.g., premature failure, system instability, etc.). Various embodiments of the present invention lower the voltage of the processor chips by modifying the frequency of interrupts of low activity cores of the processor chips to increase current levels, which lowers the voltage of the processor chips and effectively reduces reliability concerns due to exposure to overvoltages.

Various embodiments of the present invention can operate to improve stability of a computing system by increasing power consumption of specific cores of a processor chip driven by a common power source to lower the voltage of the processor chip, which increases the reliability of the processor chip and increases stability within a computing system. Additionally, embodiments of the present invention can operate to increase chip yield by reducing high voltage exposure of processor chips during integrated circuit (IC) final testing by exposing at least one core of the processor chips to frequency interrupts, which results in increased power consumption and reduction in voltage of the processor chips.

Implementation of embodiments of the invention may take a variety of forms, and exemplary implementation details are discussed subsequently with reference to the Figures.

Figure 1:
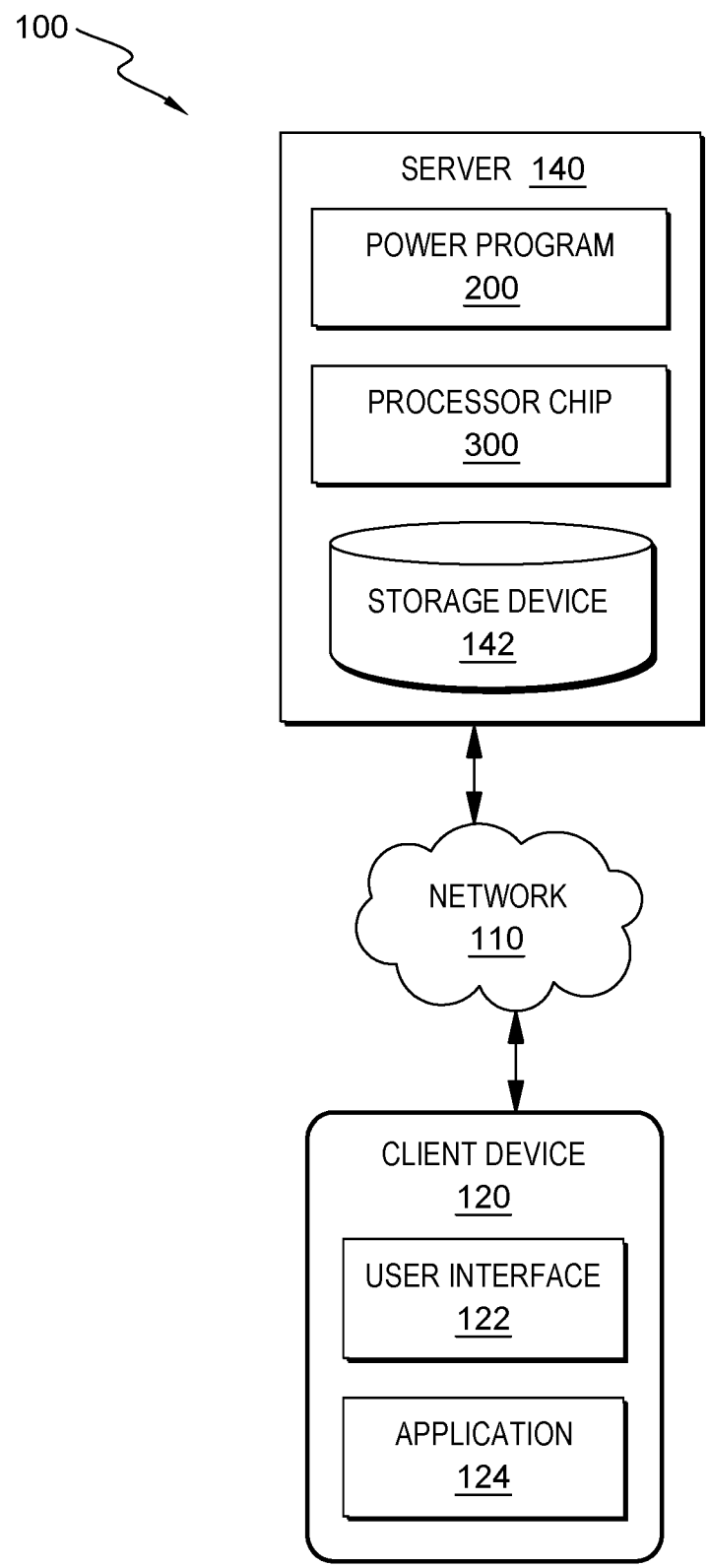
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 140 and client device 120, all interconnected over network 110. Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140, client device 120, and other computing devices (not shown) within distributed data processing environment 100.

Client device 120 can be one or more of a laptop computer, a tablet computer, a smart phone, smart watch, a smart speaker, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 7, in accordance with embodiments of the present invention.

Client device 120 may include one or more processors, user interface 122, and application 124. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 7, in accordance with embodiments of the present invention.

Server 140 can be a standalone computing device, a management server, a web server, a mobile computing device, mainframe, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120 and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, processor chip 300, and power program 200. Storage device 142 can be implemented with any type of storage device, for example, persistent storage 705 (FIG. 7), which is capable of storing data that may be accessed and utilized by client device 120 and server 140, such as a database server, a hard disk drive, or a flash memory. In one embodiment storage device 142 can represent multiple storage devices within server 140. In various embodiments of the present invention, storage device 142 stores a plurality of information, such as firmware. In another embodiment, data processing environment 100 can include additional servers (not shown) that host additional information that accessible via network 110.

In one embodiment processor chip 300 can be a multi-core processor with two or more independent computing/processing elements (e.g., cores) on the same chip, which read and execute program instructions as if a computing device had several processors. Furthermore, multiple cores have the advantage that the multiple cores run at lower frequencies as compared to a single processing unit, which reduces the power dissipation or temperature. In various embodiments of the present invention processor chip 300 can be a multi-processor core chip (e.g., system on chip), which includes multiple processing elements with specific functionalities, a memory hierarchy, and I/O components linked by an on-chip interconnect (e.g., buses, networks on chip, etc.). Generally, high-performance multi-core processor chips do not have the ability to regulate voltages of individual processing units, since the plurality of processing units are be driven by a common power grid. Additionally, a voltage max (e.g., technical threshold maximum) of a processor chip may fluctuate due to fabrication processes variation during manufacture. However, in various embodiments of the present invention processor chip 300 can operate above the technical threshold maximum at the cost of reliability of processor chip 300 or manufacturer yield (e.g., the proportion of devices on the wafer found to perform properly).

In various embodiments of the present invention, power program 200 can be implemented to reduce a voltage of a multi-core processor chip or a multiprocessor system on chip (SOC). In one embodiment, power program 200 regulates a voltage of processor chip 300. For example, power program 200 reduces a voltage of a processor unit (e.g., processor chip 300) below a maximum voltage rating (e.g., Tech Vdd Max) of the processor unit. In this example, power program 200 identifies one or more spare processing elements, which includes but is not limited to processing elements with uncharacterized processor unit functions, several processing functions disabled, etc.

In another embodiment, power program 200 modifies an interrupt frequency of a processing element of processor chip 300. For example, power program 200 modifies a frequency of interrupts of one or more spare processing elements of a processor unit. In this example, the one or more spare processing elements are in an idle state (e.g., power save state, executing no code or instructions, etc.) and power program 200 transmits one or more interrupt signals to the one or more spare processing elements that cause the one or more spare processing elements to exit the idle state (i.e., enter a performance state), which increases the current flow (e.g., Idd) or activity level of the one or more spare processing elements (i.e., decreasing the voltage of the processing unit).

In yet another embodiment, power program 200 characterizes a function of one or more processing elements of processor chip 300. For example, power program 200 modifies instructions of a memory device of a processing element (e.g., core) of a multi-core processor unit (e.g., processor chip 300). In this example, power program 200 modifies firmware of the memory device of the processing element of the multi-core processor unit to disable several processing functions of the processing element (i.e., assign the processor chip a spare processing unit). Additionally, if a computing device (e.g., server 140) includes one or more multi-core processor chips, then power program 200 can modify firmware of the one or more multi-core processor chips to result in a spare processing unit for each of the one or more multi-core processor chips of the computing device. In another example, power program 200 can modify the firmware of a multi-processor mainframe (e.g., server 140) to include instructions to distribute spare processing units of one or more multi-core processing chips (e.g., processor chip 300) to each of the one or more multi-core processing chips of the multi-processor mainframe. Alternatively, the methodology of power program 200 can be utilized to modify firmware of processing units of system-on-chips (SoCs) as well.

Figure 2:
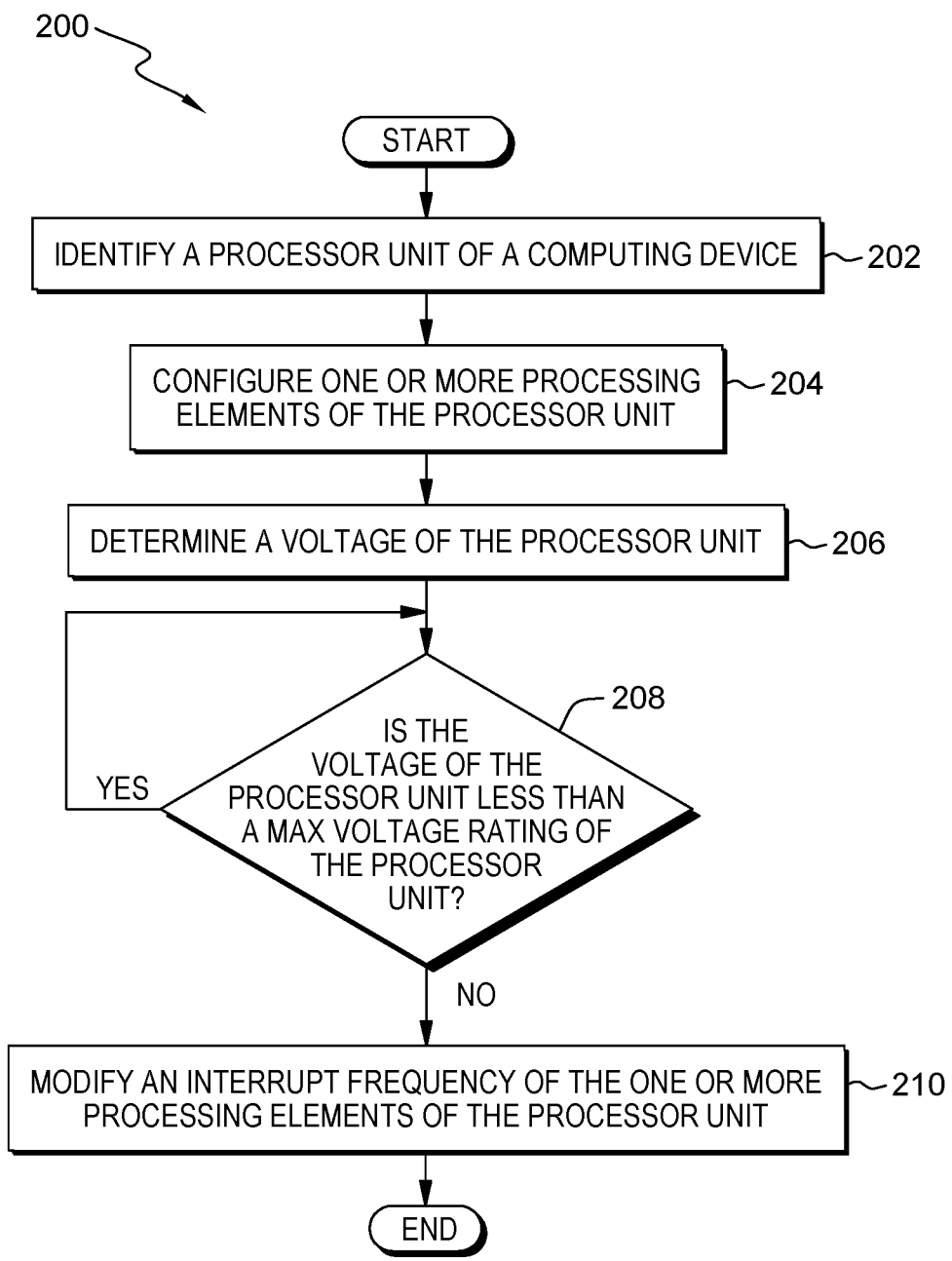
FIG. 2 is a flowchart depicting operational steps of a program, within the data processing environment of FIG. 1, for avoiding overvoltages of a processor chip, in accordance with embodiments of the present invention.

FIG. 2 is a flowchart depicting operational steps of power program 200, a program for avoiding overvoltages of a processor chip, in accordance with embodiments of the present invention. In one embodiment, power program 200 initiates in response to server 140 powering on. For example, power program 200 initiates in response to a computing device (e.g., server 140) initiating a boot process.

In step 202, power program 200 identifies a processor unit of a computing device. In one embodiment, power program 200 identifies processor chip 300 of server 140. For example, power program 200 can query a system profiler of a computing device (e.g., server 140) to determine what types of devices (e.g., hardware) are connected to the computing device. In this example, power program 200 can retrieve information about a central processing unit (CPU) (e.g., processor chip 300) from the system profiler. Additionally, power program 200 can utilize the information to determine a number of processors, processor type, maximum operating voltage rating, number of cores (e.g., processing elements), function characterization of cores, availability of cores, core voltage, clock speed, etc. Furthermore, power program 200 can utilize the information of the system profiler to determine whether the computing device includes two or more CPUs (i.e., determine whether the computing device is a multiprocessor computing device), and retrieve information (e.g., processor symmetry, characterization, etc.) about functions of the two or more CPUs.

In another embodiment, power program 200 identifies processor chip 300. In various embodiments of the present invention, server 140 can represent an integrated circuit (IC) tester or automatic test equipment (ATE), which are systems for applying electrical signals to a semiconductor device (e.g., processor chip 300) to compare output signals against expected values for the purpose of determining whether the semiconductor device performs in accordance with design specifications. Additionally, IC testing is conducted at two levels: the wafer testing and the package test (e.g., final test), the latter utilizes a handler and a test socket, along with a tester. For example, an IC tester system (e.g., server 140, automatic test equipment, etc.) utilizes power program 200 in a semiconductor final test module (e.g., package testing, etc.) to monitor an IC socket of the IC tester system. In this example, power program 200 detects that one or more pins of an IC chip (e.g., processor chip 300, multi-core processor chip, etc.) connect to one or more contacts of the IC socket.

Figure 3:
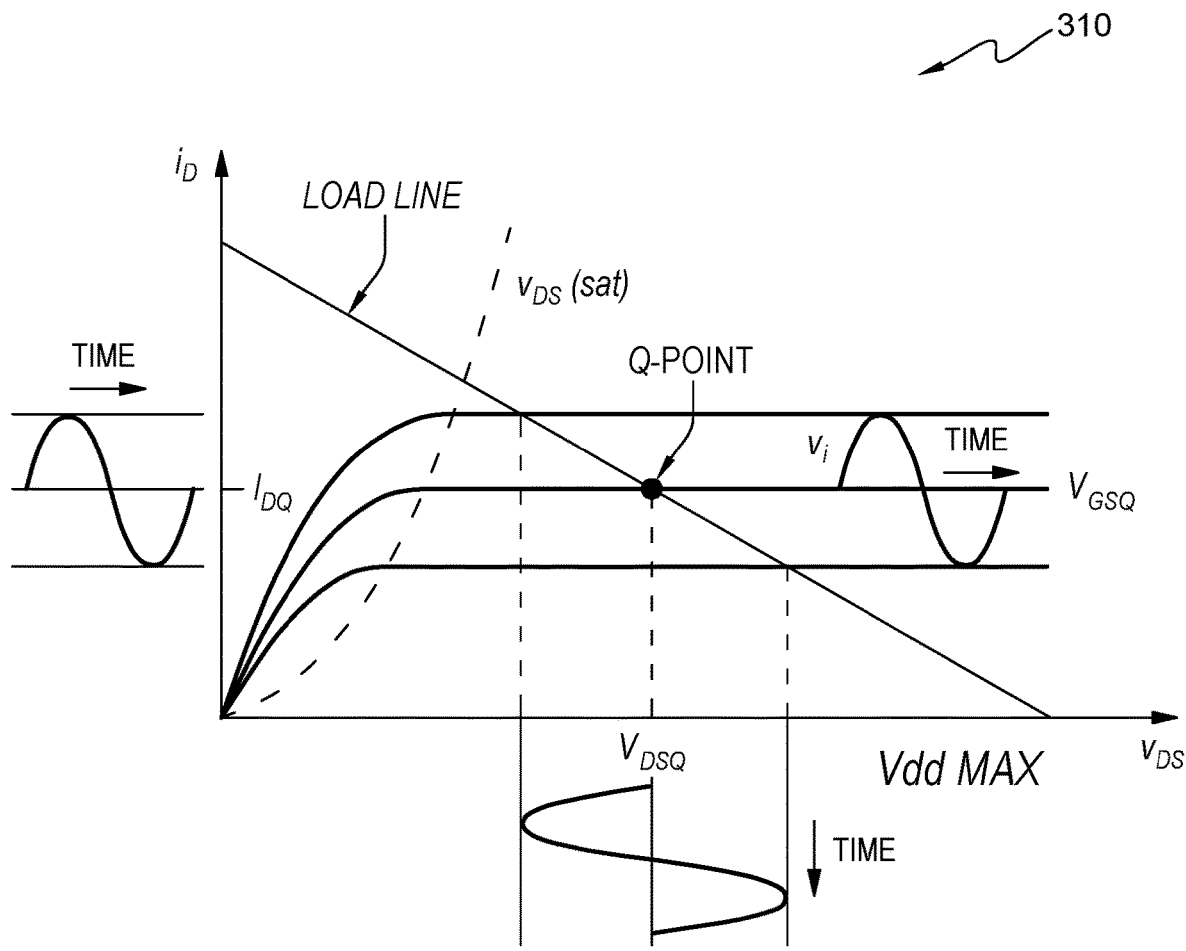
FIG. 3 is a diagram depicting operating characteristics of a CMOS transistor, in accordance with embodiments of the present invention.

Various embodiments of the present invention recognize that a processor unit (e.g., complimentary metal-oxide-semiconductor (CMOS) processor chip) is exposed to high voltages due to operating conditions that draw very little current (i.e., cores of a CPU in an idle state), which result in overvoltages that can cause considerable damage to the processor unit. FIG. 3 depicts environment 310, which is a diagram of operating characteristics of a CMOS transistor. Environment 310 includes a DC load line that represents the relationship between a supply current (e.g., $i_D$) and a supply voltage (e.g., $v_{DS}$), with the DC load line indicating a technical maximum supply voltage (e.g., $V_{dd\ max}$) of the CMOS transistor (e.g., the processor unit). In an example embodiment, the DC load line indicates that voltage of the processor varies inversely with the current of the processor.

Figure 4A:
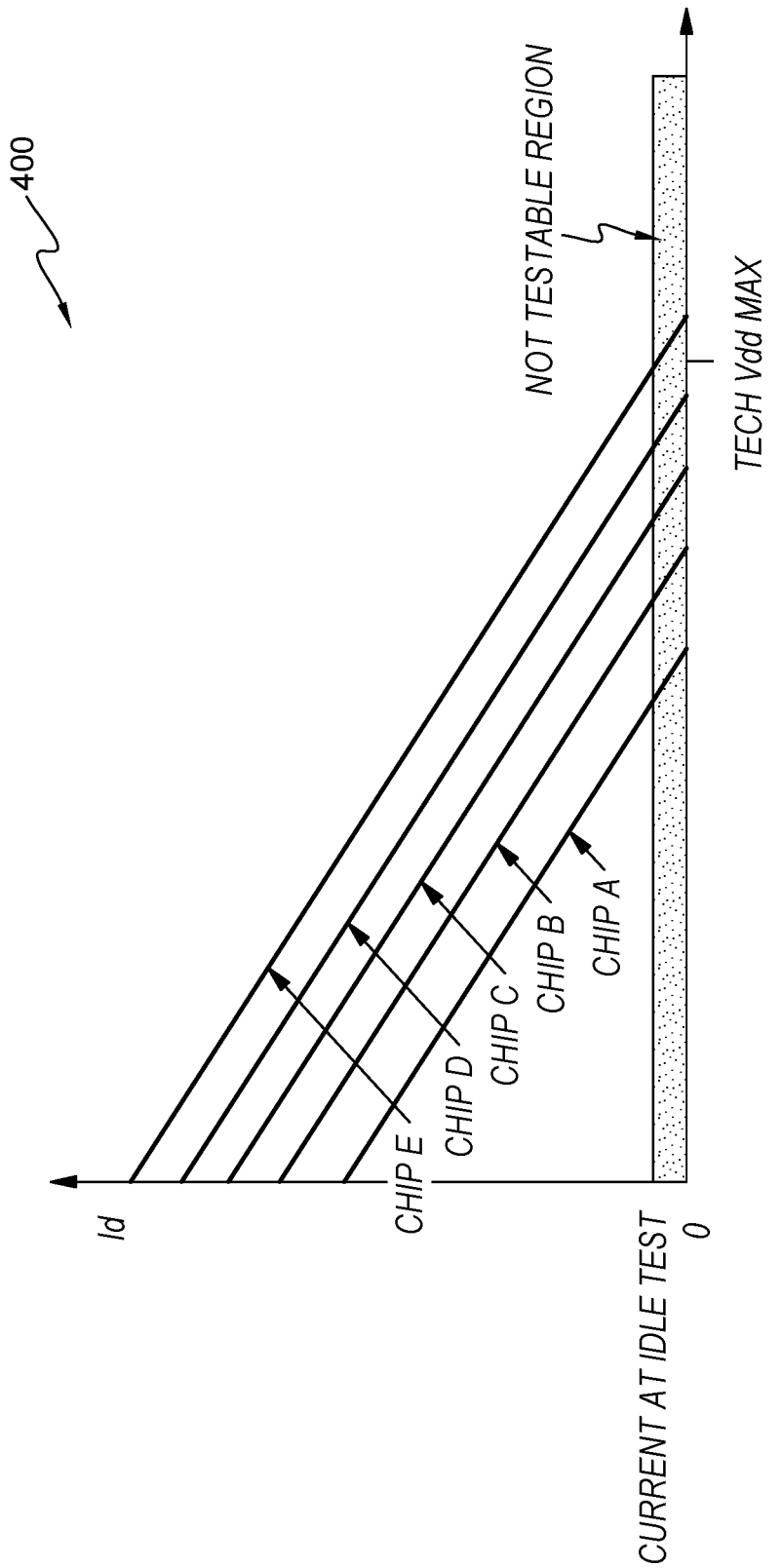
FIG. 4A is a diagram depicting a table of DC load lines of a plurality of processor chips, in accordance with embodiments of the present invention.

FIG. 4A depicts environment 400, which is a table of DC load lines of a plurality of processor chips. Environment 400 includes respective technical maximum supply voltages (e.g., $V_{dd\ max}$) of the plurality of processor chips and a "Not testable region" where a supply current (e.g., $i_D$) is very low due to one or more processor cores of the plurality of processor chips being in an idle state (e.g., power save, sleep state, wait state, etc.), which draws very little current. In an example embodiment, each of the plurality of processor chips includes fluctuations in an actual voltage maximum due to process variations in fabrication of the plurality of processor chips. In this example embodiment, a processor chip (e.g., Chip E) may operate above a maximum voltage rating. In this example embodiment, operating above a maximum voltage rating (e.g., $V_{dd\ max}$) may cause stability and reliability issues within a computing system due to overvoltage damage with respect to the processor chip.

Figure 4B:
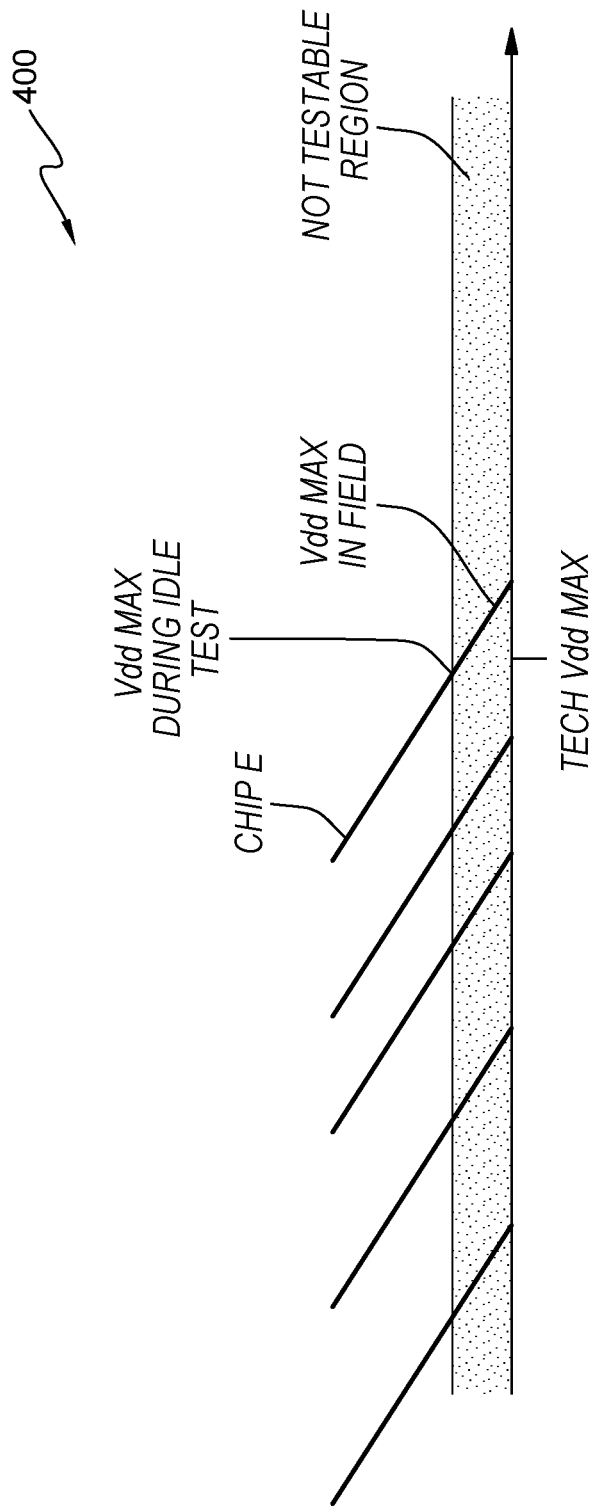
FIG. 4B is a diagram depicting an exploded view of the table of DC load lines of a plurality of processor chips of FIG. 4A, in accordance with embodiments of the present invention.

Referring to FIG. 4B, which depicts an exploded view of environment 400. In an example embodiment, FIG. 4B displays a voltage of Chip E during an idle test (e.g., current is extremely low, one or more cores in a power save state, etc.) that is above a technical maximum supply voltage (e.g., $V_{dd\ max}$). In this example embodiment, FIG. 4B indicates that some operating conditions of Chip E draw so little current that the voltage (e.g., $v_{DS}$, $V_{dd}$, etc.) of Chip E is above the technical maximum supply voltage, which is in the "Not testable region".

In step 204, power program 200 configures one or more processing elements of the processor unit. In one embodiment, power program 200 provides a set of instructions to processor chip 300. For example, power program 200 identifies a total number of cores (e.g., processing elements) of a multi-core processor (e.g., processor chip 300) of a computing device (e.g., server 140). Additionally, power program 200 can detect spare cores (e.g., uncharacterized processing elements) of the multi-core processor. In one scenario, if power program 200 does not detect a spare core, then power program 200 can provide instructions (e.g., firmware instructions) to a memory device (e.g., RAM, Cache, etc.) of a core to recharacterize the core as a spare core by disabling one or more functions of the core. In another scenario, power program 200 can provide instructions to characterize at least one core of a multi-core processor as a spare core to a memory device when the computing device initiates a bootup sequence. In this example, power program 200 can repeat the above methodology for one or more multi-core processors of the computing device.

In another example, power program 200 identifies a total number of spare cores (e.g., uncharacterized processing elements) of two or more processor chips (e.g., processor chip 300) of a computing device (e.g., server 140). Additionally, power program 200 can provide instructions to a memory device (e.g., cache, RAM, etc.) of each spare core, assigning each of the spare cores to one of the two or more processor chips of the computing device. In this example, power program 200 distributes the total number of spare cores equally amongst the two or more processor chips.

In step 206, power program 200 determines a voltage of the processor unit. In one embodiment, power program 200 determines a voltage of processor chip 300. For example, power program 200 determines a voltage of a multi-core CPU (e.g., processor chip 300) of a computing device (e.g., server 140). In this example, power program 200 retrieves a voltage of the multi-core CPU from a system profiler of the computing device. In an alternative example, power program 200 monitors a voltage of the multi-core CPU by measuring the voltage across the multi-core processor. In another example, power program 200 utilizes an IC socket of an IC tester (e.g., server 140) to determine a voltage of an IC chip (e.g., processor chip) during a final test module. In this example, power program 200 uses the digital signal processing (DSP) instruments of the IC tester to capture voltage measurements of the IC chip.

Figure 5:
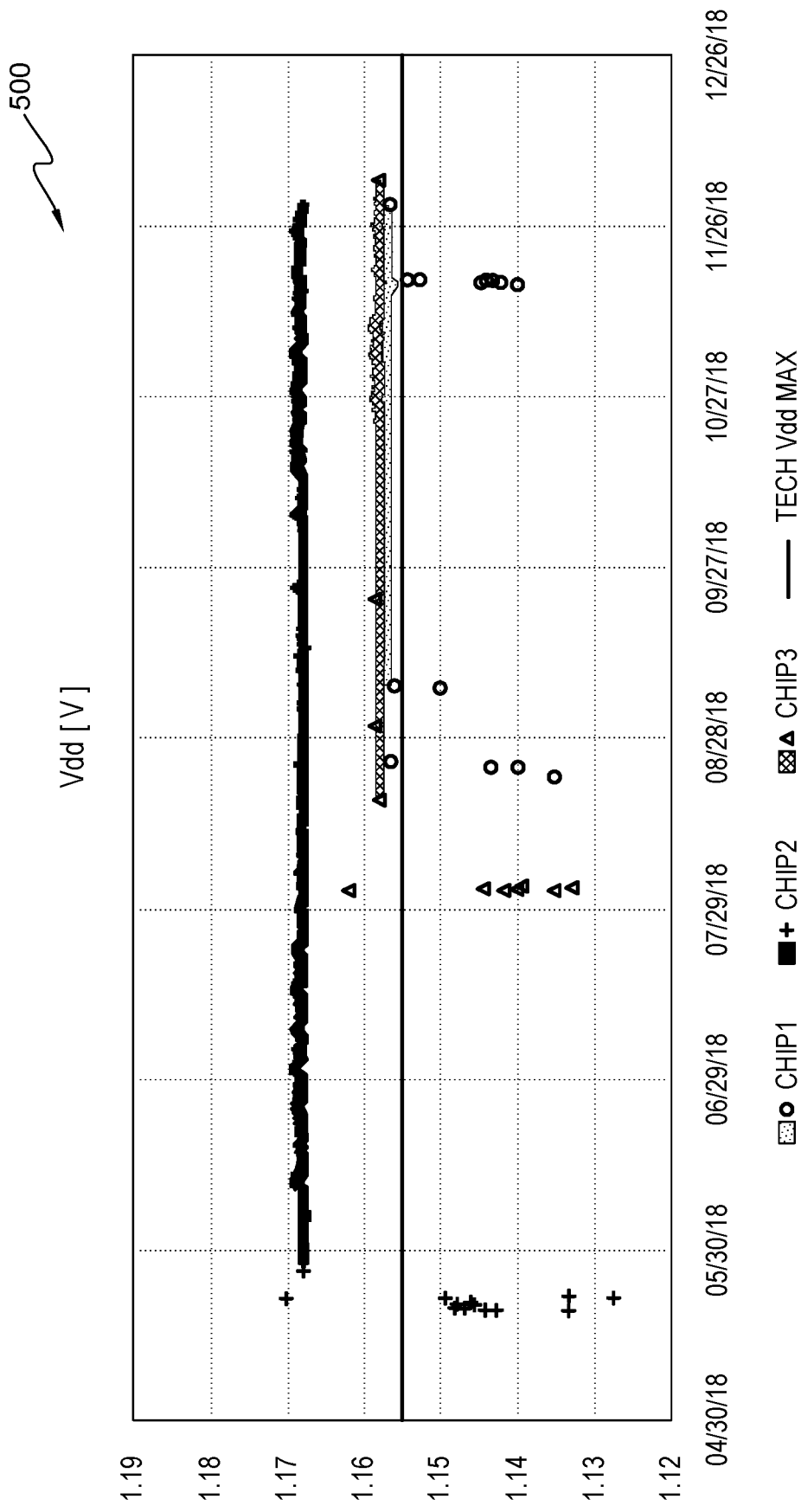
FIG. 5 is a diagram depicting a table of supply voltage measurements of processor chips, in accordance with embodiments of the present invention.

FIG. 5 depicts table 500, which is includes supply voltage measurements (e.g., $V_{dd}$) of three (3) processor chips and a technical maximum supply voltage (e.g., Tech $V_{dd\ max}$) of the three processor chips. Table 500 includes voltage measurements of Chip 1, Chip 2, and Chip 3 by power program 200 over a defined time period (e.g., 9 months). In an example embodiment, voltage measurements of Chip 1, Chip 2, and Chip 3 exceed a Tech $V_{dd\ max}$ when activity of one or more cores of Chip 1, Chip 2, and Chip 3 is extremely low (e.g., idle state, sleep state, power save mode, etc.). Additionally, table 500 indicates that Chip 1, Chip 2, and Chip 3 can operate above the respective technical maximum supply voltage, which can lead to serious reliability concerns due to overvoltage damage.

In decision step 208, power program 200 determines whether the voltage of the processor unit is less than a max voltage rating of the processor unit. In one embodiment, power program 200 determines whether a voltage of processor chip 300 requires reduction. For example, power program 200 retrieves a voltage of a multi-core CPU (e.g., processor chip 300) of a computing device (e.g., server 140) as discussed in step 206 and compares the voltage to a defined threshold value (e.g., a maximum voltage rating of the multi-core processor, a user defined voltage max, system voltage max, etc.). In this example, power program 200 utilizes the defined threshold value to determine whether to reduce the voltage of the multi-core processor due to conditions (e.g., voltage measurements, processor unit activity, etc.) that exist in the operating field of the multi-core processor that can cause reliability and stability concerns.

If power program 200 determines that a voltage of processor chip 300 does not require reduction (i.e., less than a max rating) (decision step 208, "YES" branch), then power program 200 continues to monitor the voltage of processor chip 300. In one scenario, power program 200 compares a voltage of a multi-core CPU (e.g., processor chip 300) of a computing device (e.g., server 140) to a voltage maximum of the computing device and determines that the voltage of a multi-core CPU is less than the voltage maximum of the computing device. In this scenario, power program 200 determines that the voltage of the multi-core CPU does not require reduction (i.e., a reliability/stability concern is not detected) and continues to monitor the voltage of the multi-core CPU.

Referring now to FIG. 5, in an example embodiment, power program 200 compares a voltage measurement of Chip 3 on approximately 07/29/18 (e.g., 1.14 volts) to a Tech $V_{dd}$ Max value (e.g., Tech $V_{dd\ max}$) of Chip 3 (e.g., 1.155 volts). In this example embodiment, power program 200 determines that the voltage measurement of Chip 3 (e.g., 1.14 volts) is less than the Tech $V_{dd}$ Max value of Chip 3 (e.g., 1.155 volts). As a result, power program 200 determines that Chip 3 is not experiencing any conditions that may cause reliability concerns and continues to monitor voltage measurements of Chip 3.

If power program 200 determines that a voltage of processor chip 300 does require reduction (i.e., greater than a max rating) (decision step 208, "NO" branch), then power program 200 transmits an input signal to one or more processing elements of processing chip 300. In one scenario, power program 200 compares a voltage of a multi-core CPU (e.g., processor chip 300) of a computing device (e.g., server 140) to a voltage maximum of the computing device and determines that the voltage of a multi-core CPU is greater than or equal to the voltage maximum of the computing device. In this scenario, power program 200 determines that the voltage of the multi-core CPU does requires reduction (i.e., a reliability concern is detected) and transmits an input signal to at least one spare core of a multi-core CPU.

Referring now to FIG. 5, in an example embodiment, power program 200 compares a voltage measurement of Chip 3 on approximately 08/28/18 (e.g., 1.158 volts) to a Tech $V_{dd}$ Max value (e.g., Tech $V_{dd\ max}$) of Chip 3 (e.g., 1.155 volts). In this example embodiment, power program 200 determines that the voltage measurement of Chip 3 (e.g., 1.158 volts) is greater than the Tech $V_{dd}$ Max value of Chip 3 (e.g., 1.155 volts). As a result, power program 200 determines that Chip 3 is experiencing a voltage overage that may cause reliability concerns and transmits an interrupt (e.g., power save exit, input signal, etc.) to at least one spare core of Chip 3.

In step 210, power program 200 modifies an interrupt frequency of the one or more processing elements of the processor unit. Various embodiments of the present invention recognize that a simple voltage cap at a Tech $V_{dd}$ Max value is impractical due to power starve conditions when activity levels of a processing element (e.g., core) goes from extremely low (e.g., wait state, sleep state, power save state, etc.) to extremely high (e.g., processing a large workload) within nanoseconds and the power supplies located on the Point of Load (POL) cards can only adjust currents and voltages in the millisecond regime. In various embodiments of the present invention power program 200 provides a means for tunable power save loops that allows for capabilities that maximize power efficiency and reduce voltage of a processor chip to prevent overvoltages, which provides a viable solution to effectively address reliability and computing system stability concerns.

In one embodiment, power program 200 modifies an interrupt frequency of one or more processing elements of processor chip 300. For example, power program 200 controls current flow (e.g., power consumption) by modifying a frequency of power save state exits (e.g., interrupts) a spare core of a multi-core CPU (e.g., processor chip 300). Additionally, power program 200 can interrupt a power save mode (e.g., state of very low activity, low current flow, idle state, etc.) of the spare core of the multi-core CPU increases current flow (e.g., activity level, power consumption, etc.) of the spare core, which reduces the voltage of the multi-core CPU. In this example, power program 200 increases the frequency of interrupts to one or more spare cores of the multi-core CPU with respect to the number of spare cores available or configured (as discussed in step 204) of the multi-core CPU.

In another example, power program 200 utilizes an IC socket of an IC tester (e.g., server 140, automatic test equipment, etc.) to transmit interrupts to one or more idle cores (e.g., spare, low current, low activity, etc.) of an IC chip (e.g., processor chip 300) during a final test module. In this example, power program 200 can increases the frequency of interrupts to the IC chip, which increases the current (e.g., Ida) and reduces the voltage (e.g., $V_{dd}$) of the IC chip, until the voltage of the IC chip is below a maximum voltage rating (e.g., Tech $V_{dd}$ max) of the IC chip. As a result, power program 200 increases yield and reduces scrap by preventing overvoltages and damage to cores of the IC chips.

Figure 6A:
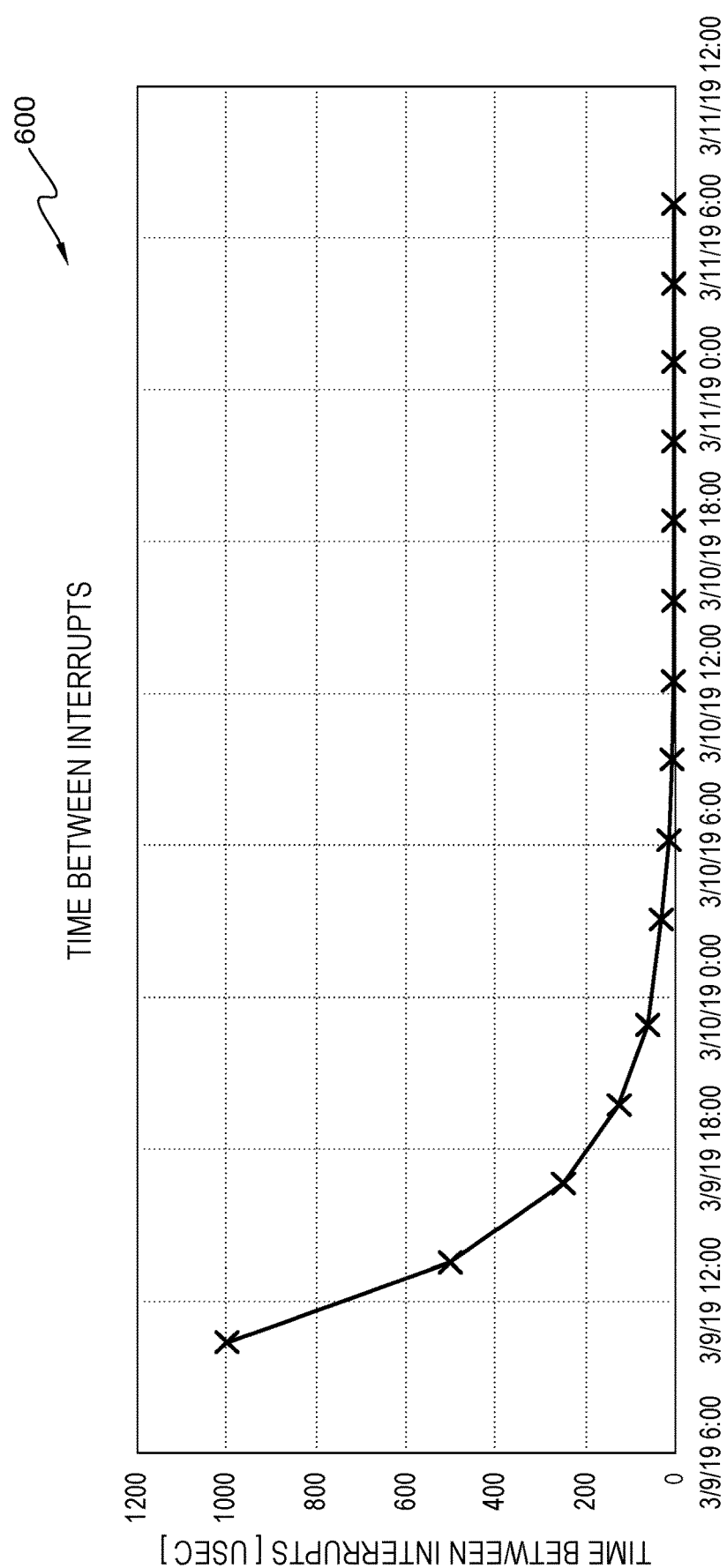
FIG. 6A is a diagram depicting a table of time intervals between interrupts, in accordance with embodiments of the present invention.

FIG. 6A depicts table 600, which is a table of time between interrupts. Table 600 includes a line graph plot of time between interrupts on a six (6) hour scale. In an example embodiment, power program 200 can systematically lower interrupt time intervals in a microsecond regime on a computing device (e.g., server 140, automatic test machine, etc.).

Figure 6B:
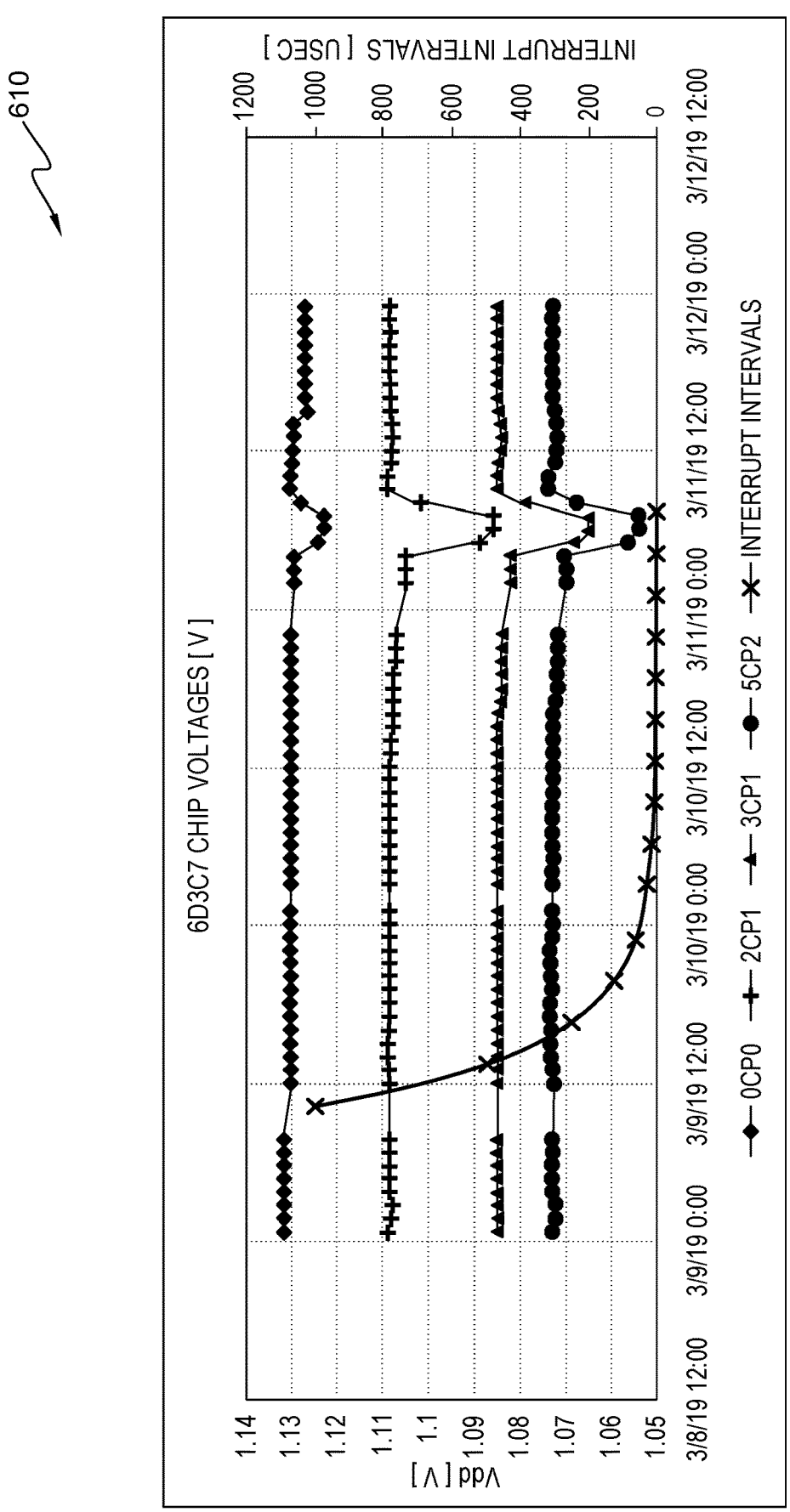
FIG. 6B is a diagram depicting a table of a relationship between time between interrupts and processor chip voltages, in accordance with embodiments of the present invention.

FIG. 6B depicts table 610, which is a table depicting a relationship between time between interrupts and chip voltages. Table 610 includes voltages of a plurality of processor chips cross referenced with interrupt intervals of table 600 of FIG. 6A, Chip 0CP0, Chip 2CP1, Chip 3CP1, and Chip 5CP2.

In an example embodiment, power program 200 systematically modifies the time between interrupts (e.g., interrupt frequency) for one or more spare cores of Chip 0CP0, Chip 2CP1, Chip 3CP1, and Chip 5CP2 (e.g., processor chip 300). Additionally, power program 200 configures Chip 0CP0 to include two (2) spare cores, and Chip 2CP1, Chip 3CP1, and Chip 5CP2 to include at least seven (7) spare cores. In this example embodiment, table 610 indicates that power program 200 is systematically modifying the interrupt frequency for the plurality of processor chips, which can lower voltages of the plurality of processor chips by twenty (20) millivolts (mV). Furthermore, power program 200 can use information of table 610 (e.g., interrupt frequency, voltage measurements, etc.) to modify power save loops of each of Chip 0CP0, Chip 2CP1, Chip 3CP1, and Chip 5CP2 in order to prevent each respective voltage from exceeding a respective maximum voltage rating.

Figure 6C:
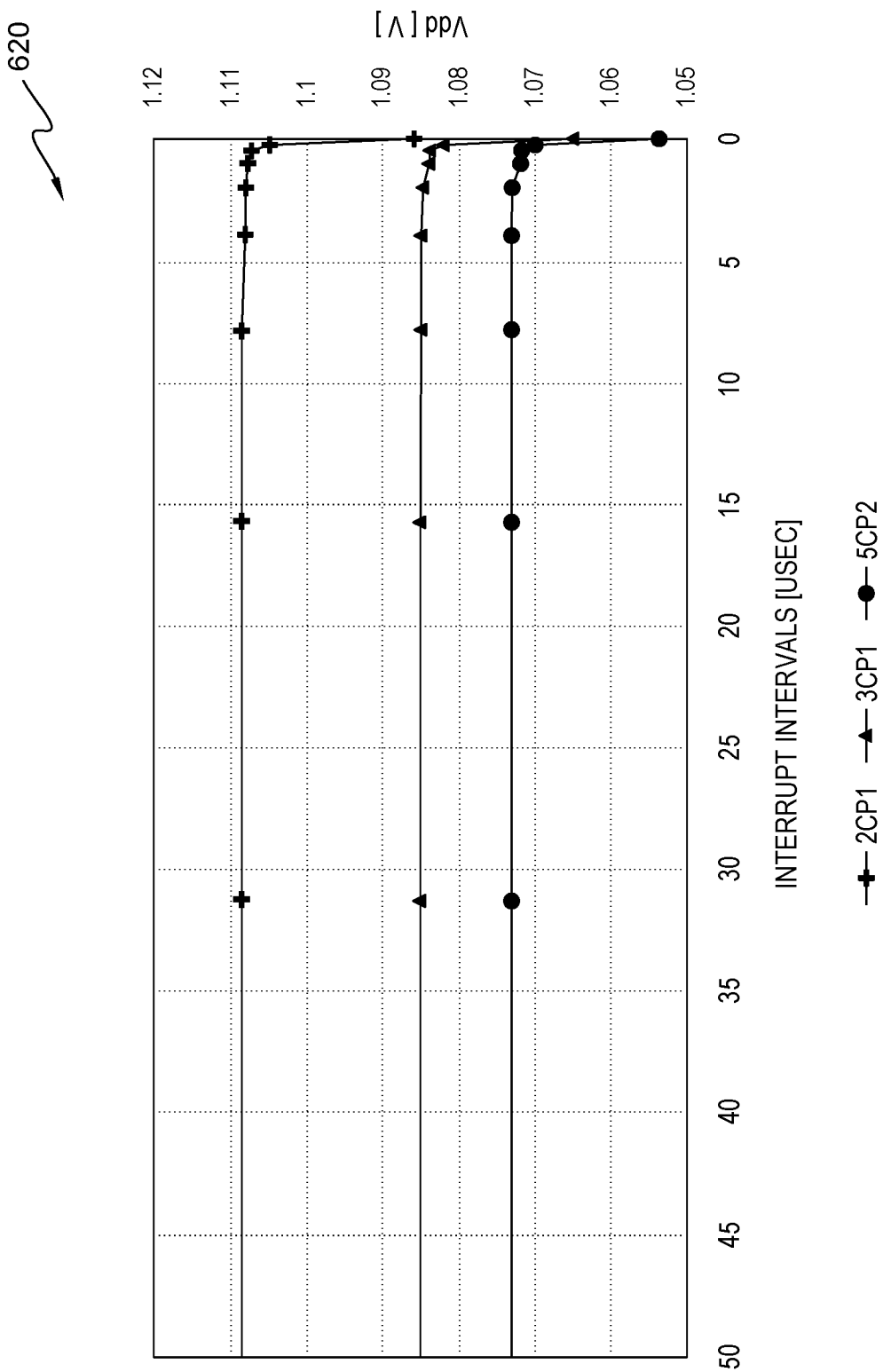
FIG. 6C is a diagram depicting a table of processor chip voltages as a function of interrupt intervals on a linear scale, in accordance with embodiments of the present invention.
Figure 6D:
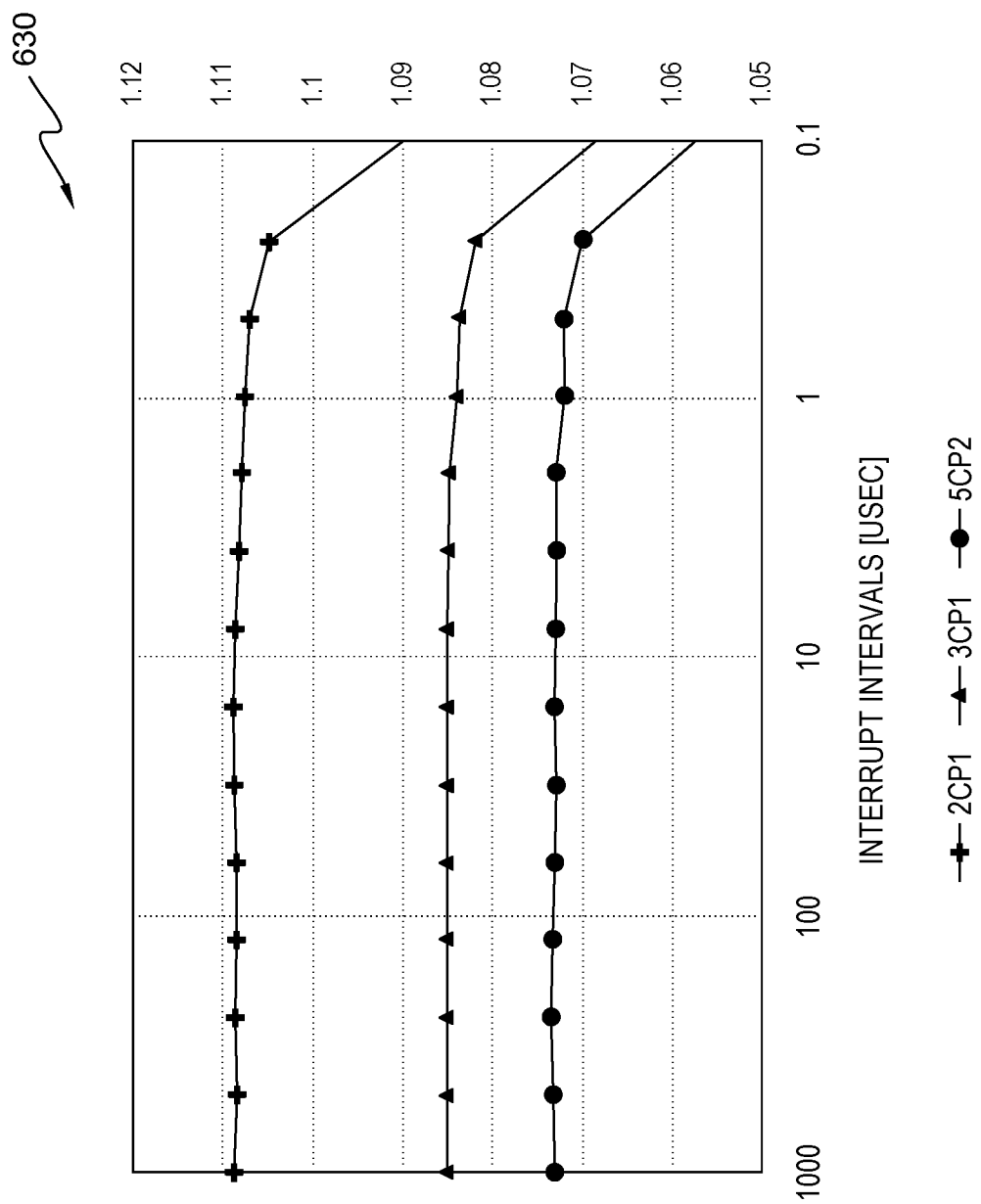
FIG. 6D is a diagram depicting a table of processor chip voltages as a function of interrupt intervals on a logarithmic scale, in accordance with embodiments of the present invention.

FIG. 6C depicts table 620, which is a table depicting chip voltages as a function of interrupt intervals on a linear scale. Table 620 includes a line plot of voltages Chip 2CP1, Chip 3CP1, and Chip 5CP2 while power program 200 decreases time intervals between interrupts on a microsecond regime. FIG. 6D depicts table 630, which is a table depicting chip voltages as a function of interrupt intervals on a logarithmic scale. Table 620 includes a line plot of voltages Chip 2CP1, Chip 3CP1, and Chip 5CP2 while power program 200 decreases time intervals between interrupts on a microsecond regime, which further implies a relationship between chip voltage and interrupt frequency. In an example embodiment, power program 200 can regulate a voltage of one or more processor chips (e.g., processor chip 300, Chip 2CP1, Chip 3CP1, Chip 5CP2, etc.) based on modifying an interrupt frequency to one or more spare cores of the one or more processor chips (i.e., tuning power save exits based on interrupt frequency).

Figure 6E:
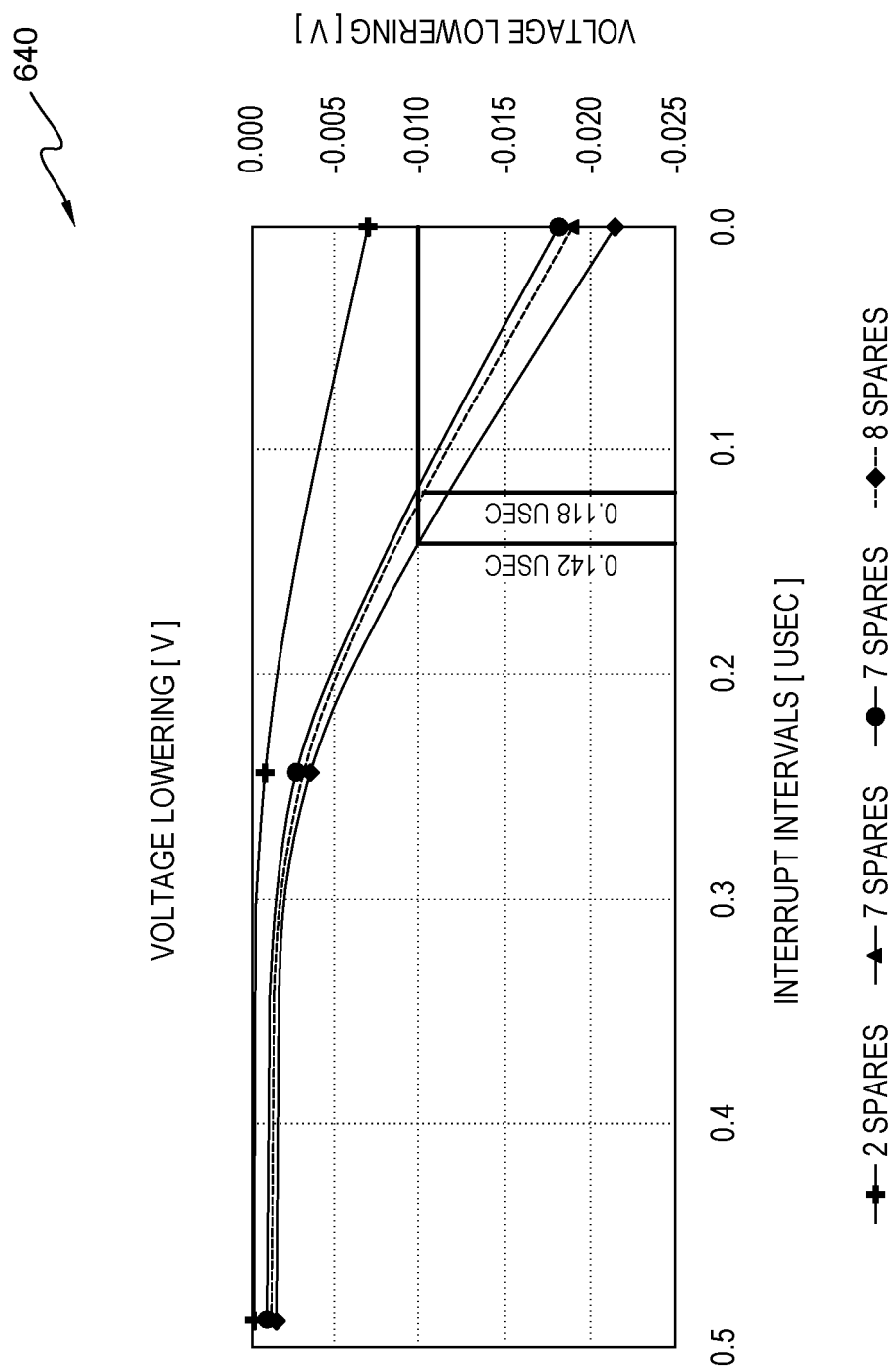
FIG. 6E is a diagram depicting a table of a relationship between time between interrupts, processor chip voltages, and number of spare cores of the processor chips, in accordance with embodiments of the present invention.

FIG. 6E depicts table 640, which is a table depicting a relationship between time between interrupts, chip voltages, and number of spare cores of a plurality of processor chips. Table 640 includes a line plot of voltages of a plurality of processor chips where power program 200 has configured a first processor chip to include two (2) spare cores, a second processor chip to include seven (7) spare cores, a third processor chip to include seven (7) spare cores, and a fourth processor chip to include eight (8) spare cores, while power program 200 decreases time intervals between interrupts on a microsecond regime.

In an example embodiment, power program 200 can regulate a voltage of the plurality of processor chips (e.g., processor chip 300) based on modifying an interrupt frequency to one or more spare cores of the plurality of processor chips. Thus, chips react differently to varying interrupt intervals depending on the quantity of spare cores exposed to the interrupts. In an example embodiment, if a user desires a specific voltage lowering (e.g. of 10 mV), then power program 200 tunes the interrupt frequencies to specific values, with reference to the fourth processor chip the value is 0.142 µsec in one example, and with reference to the second processor chip the value is 0.118 µsec in another example.

Figure 7:
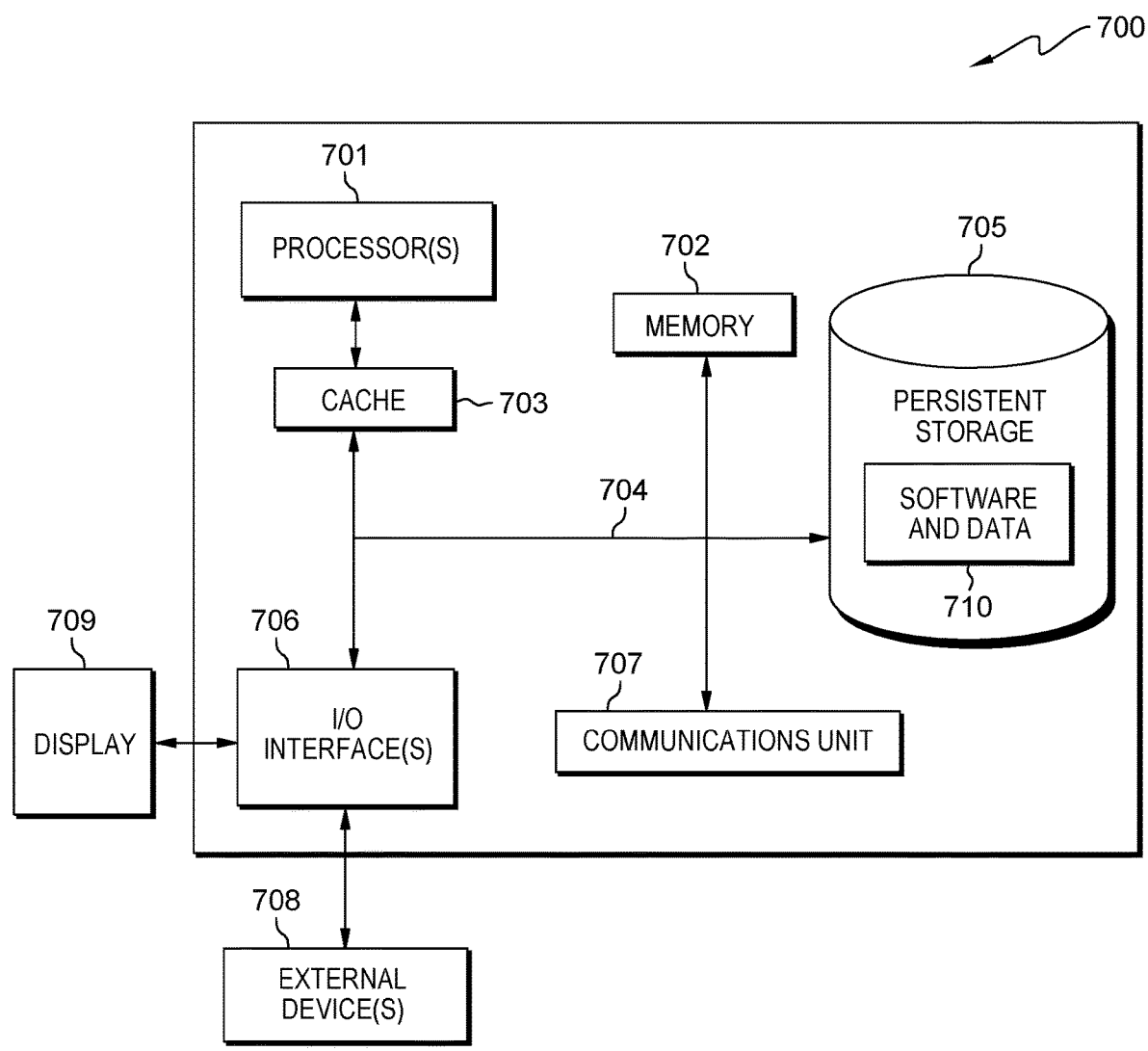
FIG. 7 is a block diagram of components of FIG. 1, in accordance with an embodiment of the present invention.

FIG. 7 depicts a block diagram of components of client device 120 and server 140, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

FIG. 7 includes processor(s) 701, cache 703, memory 702, persistent storage 705, communications unit 707, input/output (I/O) interface(s) 706, and communications fabric 704. Communications fabric 704 provides communications between cache 703, memory 702, persistent storage 705, communications unit 707, and input/output (I/O) interface(s) 706. Communications fabric 704 can be implemented with any architecture designed for passing data and/or control information between processors (such as microprocessors, communications and network processors, etc.), system memory, peripheral devices, and any other hardware components within a system. For example, communications fabric 704 can be implemented with one or more buses or a crossbar switch.

Memory 702 and persistent storage 705 are computer readable storage media. In this embodiment, memory 702 includes random access memory (RAM). In general, memory 702 can include any suitable volatile or non-volatile computer readable storage media. Cache 703 is a fast memory that enhances the performance of processor(s) 701 by holding recently accessed data, and data near recently accessed data, from memory 702.

Program instructions and data (e.g., software and data 710) used to practice embodiments of the present invention may be stored in persistent storage 705 and in memory 702 for execution by one or more of the respective processor(s) 701 via cache 703. In an embodiment, persistent storage 705 includes a magnetic hard disk drive. Alternatively, or in addition to a magnetic hard disk drive, persistent storage 705 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 705 may also be removable. For example, a removable hard drive may be used for persistent storage 705. Other examples include optical and magnetic disks, thumb drives, and smart cards that are inserted into a drive for transfer onto another computer readable storage medium that is also part of persistent storage 705. Software and data 710 can be stored in persistent storage 705 for access and/or execution by one or more of the respective processor(s) 701 via cache 703. With respect to client device 120, software and data 710 includes data of user interface 122 and application 124. With respect to server 140, software and data 710 includes data of storage device 142 and power program 200.

Communications unit 707, in these examples, provides for communications with other data processing systems or devices. In these examples, communications unit 707 includes one or more network interface cards. Communications unit 707 may provide communications through the use of either or both physical and wireless communications links. Program instructions and data (e.g., software and data 710) used to practice embodiments of the present invention may be downloaded to persistent storage 705 through communications unit 707.

I/O interface(s) 706 allows for input and output of data with other devices that may be connected to each computer system. For example, I/O interface(s) 706 may provide a connection to external device(s) 708, such as a keyboard, a keypad, a touch screen, and/or some other suitable input device. External device(s) 708 can also include portable computer readable storage media, such as, for example, thumb drives, portable optical or magnetic disks, and memory cards. Program instructions and data (e.g., software and data 710) used to practice embodiments of the present invention can be stored on such portable computer readable storage media and can be loaded onto persistent storage 705 via I/O interface(s) 706. I/O interface(s) 706 also connect to display 709.

Display 709 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   identifying, by one or more processors, one or more processing units of a computing device;
   determining, by one or more processors, respective activity levels of one or more processing elements of the one or more processing units of the computing device, wherein an activity level corresponds to current flow of a processing element;
   determining, by one or more processors, respective voltages of the one or more processing units of the computing device;
   in response to determining that a respective voltage of a first processing unit of the one or more processing units is greater than a defined threshold, modifying, by one or more processors, an interrupt frequency of a first processing element of a plurality of processing elements of the first processing unit of the computing device, wherein the interrupt frequency indicates a time interval between input signals to a processing element; and
   regulating, by one or more processors, the respective voltages of the one or more processing units of the computing device based at least in part on the respective activity levels of the one or more processing elements, wherein regulating the respective voltage of the first processing unit of the one or more processing units, further comprises:
     increasing, by one or more processors, power consumption of the first processing element of the plurality of processing elements of the first processing unit based at least in part on current flow of the first processing unit.

2. The method of claim 1, further comprising:
   identifying, by one or more processors, a function of the one or more processing elements of the one or more processing units of the computing device; and
   generating, by one or more processors, firmware instructions that configure each of the one or more processing units of the computing device, wherein the firmware instructions include commands to assign at least one spare core to each of the one or more processing units of the computing device, wherein a spare core includes a processing element with one or more disabled functions and uncharacterized processing elements.

3. The method of claim 2, further comprising:
- detecting, by one or more processors, two or more spare cores of two or more processing units of the computing device; and
- assigning, by one or more processors, an equal number of spare cores to each of the two or more processing units of the computing device.

4. The method of claim 1, wherein modifying the interrupt frequency of the first processing element of the plurality of processing elements of the first processing unit of the computing device further comprises:
- transmitting, by one or more processors, a plurality of interrupts to the first processing element within a defined timeframe based at least in part on the number of spare cores of the first processing unit, wherein the first processing element is a spare core.

5. The method of claim 1, wherein determining the respective activity levels of one or more processing elements of the one or more processing units of the computing device further comprises:
- determining, by one or more processors, a respective state of the first processing element of the plurality of processing elements of the first processing unit of the one or more processing units, wherein a low activity level corresponds to an idle power saving state.

6. The method of claim 1, further comprising:
- in response to determining that the respective voltage of the first processing unit of the one or more processing units is less than or equal to a defined threshold, monitoring, by one or more processors, the respective voltage of the first processing unit of the one or more processing units.

7. A computer program product comprising:
- one or more computer readable storage media and program instructions stored on the one or more computer readable storage media, the program instructions comprising:
- program instructions to identify one or more processing units of a computing device;
- program instructions to determine respective activity levels of one or more processing elements of the one or more processing units of the computing device, wherein an activity level corresponds to current flow of a processing element;
- program instructions to determine respective voltages of the one or more processing units of the computing device;
- in response to determining that a respective voltage of a first processing unit of the one or more processing units is greater than a defined threshold, program instructions to modify an interrupt frequency of a first processing element of a plurality of processing elements of the first processing unit of the computing device, wherein the interrupt frequency indicates a time interval between input signals to a processing element; and
- program instructions to regulate the respective voltages of the one or more processing units of the computing device based at least in part on the respective activity levels of the one or more processing elements, wherein regulating the respective voltage of the first processing unit of the one or more processing units, further comprises program instruction to:
  - increase power consumption of the first processing element of the plurality of processing elements of the first processing unit based at least in part on current flow of the first processing unit.

8. The computer program product of claim 7, further comprising program instructions, stored on the one or more computer readable storage media, to:
- identify a function of the one or more processing elements of the one or more processing units of the computing device; and
- generate firmware instructions that configure each of the one or more processing units of the computing device, wherein the firmware instructions include commands to assign at least one spare core to each of the one or more processing units of the computing device, wherein a spare core includes a processing element with one or more disabled functions and uncharacterized processing elements.

9. The computer program product of claim 8, further comprising program instructions, stored on the one or more computer readable storage media, to:
- detect two or more spare cores of two or more processing units of the computing device; and
- assign an equal number of spare cores to each of the two or more processing units of the computing device.

10. The computer program product of claim 7, wherein program instructions to modify the interrupt frequency of the first processing element of the plurality of processing elements of the first processing unit of the computing device further comprise program instructions to:
- transmit a plurality of interrupts to the first processing element within a defined timeframe based at least in part on the number of spare cores of the first processing unit, wherein the first processing element is a spare core.

11. The computer program product of claim 7, wherein program instructions to determine the respective activity levels of one or more processing elements of the one or more processing units of the computing device further comprise program instructions to:
- determine a respective state of the first processing element of the plurality of processing elements of the first processing unit of the one or more processing units, wherein a low activity level corresponds to an idle power saving state.

12. The computer program product of claim 7, further comprising program instructions, stored on the one or more computer readable storage media, to:
- in response to determining that the respective voltage of the first processing unit of the one or more processing units is less than or equal to a defined threshold, monitor the respective voltage of the first processing unit of the one or more processing units.

13. A computer system comprising:
- one or more computer processors;
- one or more computer readable storage media; and
- program instructions stored on the computer readable storage media for execution by at least one of the one or more processors, the program instructions comprising:
- program instructions to identify one or more processing units of a computing device;
- program instructions to determine respective activity levels of one or more processing elements of the one or more processing units of the computing device, wherein an activity level corresponds to current flow of a processing element;
- program instructions to determine respective voltages of the one or more processing units of the computing device;

in response to determining that a respective voltage of a first processing unit of the one or more processing units is greater than a defined threshold, program instructions to modify an interrupt frequency of a first processing element of a plurality of processing elements of the first processing unit of the computing device, wherein the interrupt frequency indicates a time interval between input signals to a processing element; and program instructions to regulate the respective voltages of the one or more processing units of the computing device based at least in part on the respective activity levels of the one or more processing elements, wherein regulating the respective voltage of the first processing unit of the one or more processing units, further comprises program instruction to:

increase power consumption of the first processing element of the plurality of processing elements of the first processing unit based at least in part on current flow of the first processing unit.

14. The computer system of claim 13, further comprising program instructions, stored on the one or more computer readable storage media for execution by at least one of the one or more processors, to:

identify a function of the one or more processing elements of the one or more processing units of the computing device; and generate firmware instructions that configure each of the one or more processing units of the computing device, wherein the firmware instructions include commands to assign at least one spare core to each of the one or more processing units of the computing device, wherein a spare core includes a processing element with one or more disabled functions and uncharacterized processing elements.

15. The computer system of claim 14, further comprising program instructions, stored on the one or more computer readable storage media for execution by at least one of the one or more processors, to:

detect two or more spare cores of two or more processing units of the computing device; and assign an equal number of spare cores to each of the two or more processing units of the computing device.

16. The computer system of claim 13, wherein program instructions to modify the interrupt frequency of the first processing element of the plurality of processing elements of the first processing unit of the computing device further comprise program instructions to:

transmit a plurality of interrupts to the first processing element within a defined timeframe based at least in part on the number of spare cores of the first processing unit, wherein the first processing element is a spare core.

17. The computer system of claim 13, wherein program instructions to determine the respective activity levels of one or more processing elements of the one or more processing units of the computing device further comprise program instructions to:

determine a respective state of the first processing element of the plurality of processing elements of the first processing unit of the one or more processing units, wherein a low activity level corresponds to an idle power saving state.

* * * * *